US011003423B2

(12) United States Patent
Mazurskiy

(10) Patent No.: US 11,003,423 B2
(45) Date of Patent: May 11, 2021

(54) SYSTEM AND METHOD FOR AUTOWIRING OF A MICROSERVICE ARCHITECTURE

(71) Applicants: Atlassian Pty Ltd., Sydney (AU); Atlassian Inc., San Francisco, CA (US)

(72) Inventor: Mikhail Mazurskiy, Sydney (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/725,894

(22) Filed: Dec. 23, 2019

(65) Prior Publication Data

US 2020/0409671 A1    Dec. 31, 2020

(30) Foreign Application Priority Data

Jun. 28, 2019 (AU) .................................. 2019902281

(51) Int. Cl.
*G06F 9/44* (2018.01)
*G06F 8/36* (2018.01)
*G06F 8/60* (2018.01)

(52) U.S. Cl.
CPC . *G06F 8/36* (2013.01); *G06F 8/60* (2013.01)

(58) Field of Classification Search
CPC ................ G06F 8/36; G06F 8/70; G06F 8/60
USPC ................................................. 717/105–116
See application file for complete search history.

(56) References Cited

U.S. PATENT DOCUMENTS

| | | | | | |
|---|---|---|---|---|---|
| 5,909,581 | A  * | 6/1999  | Park    | .......................... | G06F 8/65 717/170 |
| 5,966,141 | A  * | 10/1999 | Ito     | .......................... | G06T 17/10 345/473 |
| 6,237,135 | B1 * | 5/2001  | Timbol  | ...................... | G06F 8/34 717/107 |
| 6,434,740 | B1 * | 8/2002  | Monday  | .................... | G06F 8/34 717/108 |
| 6,604,196 | B1 * | 8/2003  | Monday  | .................. | G06F 9/465 713/100 |
| 6,763,515 | B1 * | 7/2004  | Vazquez | ................... | G06F 8/34 715/967 |
| 6,907,603 | B2 * | 6/2005  | Scott   | ......................... | G06F 8/65 707/999.001 |
| 7,003,767 | B2 * | 2/2006  | Larkin  | ...................... | G06F 8/65 717/172 |
| 7,240,325 | B2 * | 7/2007  | Keller  | ................... | G06F 9/5061 717/104 |
| 7,509,244 | B1 * | 3/2009  | Shakeri | ................. | G06F 9/5066 703/7 |
| 7,590,981 | B2 * | 9/2009  | Gupta   | ..................... | G06F 8/658 717/168 |

(Continued)

OTHER PUBLICATIONS

Medel et al, Modelling Performance & Resource Management in Kubernetes, ACM, pp. 257-262 (Year: 2016).*

(Continued)

*Primary Examiner* — Anil Khatri
(74) *Attorney, Agent, or Firm* — Brownstein Hyatt Farber Schreck, LLP

(57) ABSTRACT

A software application defined by two or more interdependent microservices can be instantiated by defining resource bundles in a dependency graph. These resource bundles can, in turn, be handled as individual resources (higher-order objects) when the software application is instantiated or provisioned by a provisioning controller.

13 Claims, 5 Drawing Sheets

(56) References Cited

U.S. PATENT DOCUMENTS

| | | | | |
|---|---|---|---|---|
| 7,885,885 | B1* | 2/2011 | Strongin, II | G06Q 40/00 705/35 |
| 8,001,013 | B2* | 8/2011 | Serbanescu | G06Q 30/0601 705/26.4 |
| 8,239,828 | B2* | 8/2012 | Liu | G06F 11/3672 717/120 |
| 8,392,877 | B1* | 3/2013 | Chiluvuri | G06F 8/36 717/107 |
| 8,510,707 | B1* | 8/2013 | Heuler | G06F 8/36 717/106 |
| 8,578,329 | B1* | 11/2013 | Chiluvuri | G06F 8/36 717/107 |
| 8,607,190 | B2* | 12/2013 | Coldicott | G06F 8/10 717/105 |
| 8,843,997 | B1* | 9/2014 | Hare | H04L 63/0815 726/3 |
| 8,869,101 | B2* | 10/2014 | Zabrovarnyy | G06F 8/51 717/105 |
| 8,954,927 | B2* | 2/2015 | Polly | G06Q 10/10 717/120 |
| 9,043,747 | B2* | 5/2015 | Eksten | G06F 8/60 717/105 |
| 9,292,306 | B2* | 3/2016 | Day | G06F 9/451 |
| 9,454,383 | B2 | 9/2016 | Cai et al. | |
| 9,569,203 | B2* | 2/2017 | Breh | G06F 8/70 |
| 9,912,553 | B1* | 3/2018 | Grebenschikov | H04L 67/10 |
| 9,934,013 | B2* | 4/2018 | Giammaria | G06F 16/9535 |
| 9,965,377 | B1* | 5/2018 | Russell | G06F 11/3684 |
| 10,095,489 | B1* | 10/2018 | Lieberman | G06F 8/71 |
| 10,255,052 | B2* | 4/2019 | Bagarolo | H04L 67/34 |
| 10,275,237 | B1* | 4/2019 | Anderson | G06F 8/60 |
| 10,452,444 | B1* | 10/2019 | Jibaja | G06F 9/5011 |
| 10,642,606 | B2* | 5/2020 | Ross | G06F 16/164 |
| 10,678,785 | B1* | 6/2020 | Anderson | G06F 16/2445 |
| 10,761,913 | B2* | 9/2020 | McClory | G06F 8/71 |
| 10,831,638 | B2* | 11/2020 | Marascu | H04L 41/5019 |
| 2006/0069717 | A1* | 3/2006 | Mamou | G06Q 10/00 709/203 |

OTHER PUBLICATIONS

Chang et al, "A Kubernetes-Based Monitoring Platform for Dynamic Cloud Resource Provisioning", IEEE, pp. 1-6 (Year: 2017).*

Petrasch, Model-based Engineering for Microservice Architectures using Enterprise Integration Patterns for inter-service Communication, IEEE, pp. 1-4 (Year: 2017).*

Brada, "Enhanced OSGi Bundle Updates to Prevent Runtime Exceptions", IEEE, pp. 92-99 (Year: 2008).*

Zhou et al, "A Component Based Approach for the Embedded Software Evolution", IEEE, pp. 701-706 (Year: 2003).*

Li et al, "Microservice Architecture in Industrial Software Delivery on Edge Devices", ACM, pp. 1-4 (Year: 2018).*

Boyer et al, Poster: A Declarative Approach for Updating Distributed Microservices, ACM, pp. 392-393 (Year: 2018).*

Jindal et al, "Performance Modeling for Cloud Microservice Applications", ACM, pp. 25-32 (Year: 2019).*

Rademacher et al, "Challenges of Domain-Driven Microservice Design", IEEE, pp. 36-43 (Year: 2018).*

Alpers et al, "Microservice based tool support for business process modelling", IEEE, pp. 71-78 (Year: 2015).*

Espadas et al, "Future Generation Computer Systems", Journal homepage: www.elsevier.com/locate/fgcs, pp. 273-286 (Year: 2013).*

Wu et al, "SLA-Based Resource Provisioning for Hosted Software-as-a-Service Applications in Cloud Computing Environments", IEEE, pp. 465-485 (Year: 2014).*

Nitu, "Configurability in SaaS (Software as a Service) Applications", ACM, pp. 19-26 (Year: 2009).*

Garcia et al, "A Software Process Line for Service-Oriented Applications", ACM, pp. 1680-1687 (Year: 2015).*

Aderaldo et al, "Benchmark Requirements for Microservices Architecture Research", IEEE, pp. 8-13 (Year: 2017).*

Sun et al, "An Open IoT Framework Based on Microservices Architecture", China Communication, pp. 154-162 (Year: 2017).*

Guo et al, "Microservices Architecture based Cloudware Deployment Platform for Service Computing", IEEE, pp. 358/394 (Year: 2016).*

Bakshi, "Microservices-Based Software Architecture and Approaches", IEEE, pp. 1-8 (Year: 2017).*

Eski et al, "An Automatic Extraction Approach—Transition to Microservices Architecture from Monolithic Application", ACM, pp. 1-6 (Year: 2018).*

Le Brun, Laurent, "Bazel 0.27," https://blog.bazel.build/2019/06/17/bazel-0.27.0.html, 3 pages, Jun. 17, 2019.

Author Unknown, "What is Bazel?," https://docs.bazel.build/versions/0.27.0/bazel-overview.hml, 4 pages, 2020.

* cited by examiner ary patent application no. AU2019902281, filed Jun. 28, 2019 and titled "An Improved System and Method for Autowiring of a Microservice Architecture," the disclosure of which is hereby incorporated herein by reference in its entirety.

SYSTEM AND METHOD FOR AUTOWIRING OF A MICROSERVICE ARCHITECTURE

CROSS-REFERENCE TO RELATED APPLICATION(S)

This application claims the benefit of Australian patent application no. AU2019902281, filed Jun. 28, 2019 and titled "An Improved System and Method for Autowiring of a Microservice Architecture," the disclosure of which is hereby incorporated herein by reference in its entirety.

FIELD

The present disclosure is directed to automatically connecting multiple components of a microservice architecture.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Microservices are becoming a common architecture to implement software applications. Microservices are a variant of the service-oriented architecture (SOA) architectural style that structures an application as a collection of independently deployable services. Each service is a loosely coupled component of the software application rather than a monolithic stack running on one big single-purpose machine.

A significant problem with microservice architectures is that they can be cumbersome to setup. In particular, they require the end user to know the details of how resources are connected together. A user will often have to specify many parameters and ultimately write many lines of code in order to make an application operational that is based on a microservice architecture.

Therefore there is a need for a simpler and more user-friendly solution to a setup process for a microservice architecture.

SUMMARY

Embodiments described herein are generally directed to systems and methods for automatically connecting multiple components of a microservice architecture. In some embodiments, a definition of a primary resource to be provided by a provider is received. A dependent resource of the primary resource based on the definition of the primary resource is then determined. The primary resource is requested in order to determine one or more shapes of the primary resource, where the shape is information about the primary resource that is necessary for the dependent resource to depend on the primary resource. The one or more shapes of the primary resource are received. The one or more shapes of the primary resource are then provided to the dependent resource. A provisioning object is determined based on the one or more shapes of the primary resource, wherein, in use, the provisioning object can be used by a provisioning controller to provision the resource by the provider.

In some implementations, two or more definitions of resources are also received and a graph of resources is determined. In some cases, determining a dependent resource comprises performing a topological sort of the graph of resources. Determining a provisioning object may include determining a provisioning object for each of the resources in the order determined by the topological sort.

In some implementations, the provisioning controller determines any changes to the provisioning object and may also determine a status of the primary resource from the provisioning object. In some cases, determining a status of the primary resource comprises extracting one or more resources from the provisioning object and determining the status of the one or more resources.

Some example embodiments are directed to a non-transitory computer-readable storage media storing sequences of instructions which, when executed by a processor, cause the processor to: receive a definition of a primary resource to be provided by a provider; determine a dependent resource of the primary resource based on the definition of the primary resource; request the primary resource to determine one or more shapes of the primary resource, wherein a shape is information about the primary resource that is necessary for the dependent resource to depend on the primary resource; receive the one or more shapes of the primary resource; provide the one or more shapes of the primary resource to the dependent resource; and determine a provisioning object based on the one or more shapes of the primary resource, wherein, in use, the provisioning object can be used by a provisioning controller to provision the resource by the provider.

In some implementations, when executed, the sequences of instructions further cause the processor to receive two or more definitions of resources and determine a graph of resources. In some cases, determining a dependent resource comprises performing a topological sort of the graph of resources. Determining a provisioning object may include determining a provisioning object for each of the resources in the order determined by the topological sort.

Some example embodiments are directed to a system for automatically connecting multiple components of a microservice architecture. The system may include one or more processors and one or more non-transitory computer-readable storage media storing sequences of instructions which, when executed by the one or more processors, cause the one or more processors to: receive a definition of a primary resource to be provided by a provider; determine a dependent resource of the primary resource based on the definition of the primary resource; request the primary resource to determine one or more shapes of the primary resource, wherein a shape is information about the primary resource that is necessary for the dependent resource to depend on the primary resource; receive the one or more shapes of the primary resource; provide the one or more shapes of the primary resource to the dependent resource; and determine a provisioning object based on the one or more shapes of the primary resource, wherein, in use, the provisioning object can be used by a provisioning controller to provision the resource by the provider.

In some cases, when executed, the sequences of instructions further cause the one or more processors to receive two or more definitions of resources and determine a graph of resources. In some cases, determining a dependent resource comprises performing a topological sort of the graph of resources. In some cases, determining a provisioning object comprises determining a provisioning object for each of the resources in the order determined by the topological sort.

Figure 1:
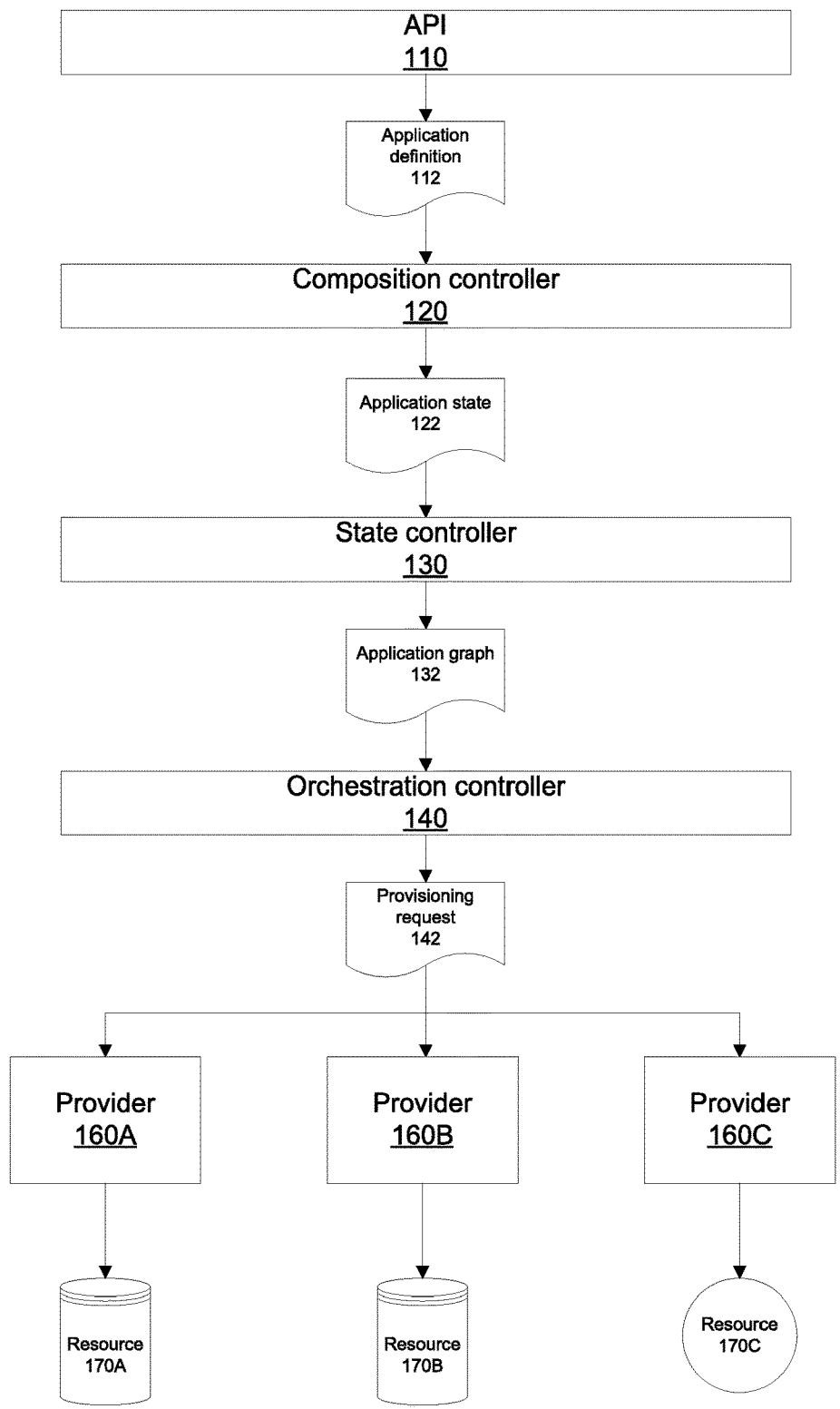
FIG. 1 is an example high-level overview of a system that provides for automatic connection of multiple components of a microservice architecture.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Overview

This disclosure relates to autowiring, which can be defined as automatically connecting multiple components of a microservice taking into account various dependencies that may exist between the multiple components.

In this disclosure, autowiring is the process of transforming a graph of resources, which may be defined by a user, into a graph of bundle resources, which can be handled by a provisioning controller where the provisioning controller will ensure that the actual resources can and will be provisioned. That is, the graph transformation is from a high level definition of resources to definitions of objects that can be used to establish a working microservice.

Further, this disclosure refers to containerized applications, that is, applications that utilize containers. A container is a lightweight, stand-alone, executable package of a piece of software that includes everything needed to run it: code, runtime, system tools, system libraries, settings. Containerized software should always run the same, regardless of the environment. For example, a container running on windows will be the same as the container running on linux or any other operating system.

Containers generally need to be able to interoperate in order to perform the functions required by the application so a container architecture usually involves the use of an orchestration system. Examples of orchestration systems include Kubernetes, Docker Swarm, Titus, Nomad, etc. Most examples in this disclosure related to Kubernetes.

This disclosure does not necessarily need to use containerized applications. however containerized applications are good examples for why autowiring can be useful as most container orchestration systems have significant setup overhead. Container orchestration systems such as Kubernetes do not provide an autowiring process and thus there is more complexity on the service owner. In particular they require the end user to know the details of how resources are connected together. As a result, they are often not suitable to executing or hosting large scale applications or any applications where the setup process is cumbersome.

The following disclosure describes a method and system in which a setup process for a container orchestration system can be reduced. To address issues that burden a service owner, embodiments of the present disclosure introduce a new autowiring method and system to optimize a service operator experience and minimize setup overhead.

In some embodiments, both the input and output of an autowiring process can be defined in a textual markup language such as yaml ("Yet Another Markup Language"). In a yaml input file for example, vertexes in the input graph may be high level definitions of resources. In a yaml output file, the corresponding vertexes in the output graph are definitions of objects such as Kubernetes objects or Smith plugins. These are examples of software tools that will be explained in more detail below.

The autowiring process, or simply referred to as autowiring, is a pure transformation, that is, it is not dependent on the state of resources. Autowiring produces objects for a provisioning controller but because it is not executing the objects or dependent on the state of the objects, it does not have any side effects. In essence, autowiring creates a program represented as a graph for some mechanism such a provisioning controller to execute later.

There is a second aspect of autowiring which is referred to as status Autowiring. As will be explained in more detail, status autowiring is a form of autowiring that allows for the status of a resource to be determined that has been bundled together for a provisioning controller.

Advantages of autowiring include providing a simple way to specify multiple resources and how they connect to each other with usable defaults. Autowiring allows a user to not have to know the details of how resources connect together and still be able to connect them together in a flexible topology. Further, because resources can be connected together more simply, more sophisticated service patterns and topologies can be achieved without increasing the management complexity. By allowing service owners to describe and deploy more complex service topologies, development speed can be improved.

In this disclosure, many of the examples of autowiring include providers. Providers is a term to refer to service providers that provide resources which can be used or accessed from another resource. In this disclosure providers can be defined individually and independently. That is, providers not only provide resources but the logic and code that enables the provision of a resource is encapsulated within the provider itself. Accordingly, a user therefore does not need to know much about the provision of resources. Autowiring works with providers in a generic way and therefore does not require any provider-specific knowledge. This means that it is easier for users to manage and operate complex topologies in a more unified manner and their operational burden may be reduced.

Architecture

FIG. 1 is an illustration of an example architecture by which the method and system as described operates, with particular reference to Kubernetes, which is as noted above, a container orchestration system.

Initially a service owner utilises an API 110 to define an application as the application definition 112. An application definition is a declaration of services, resources and their dependencies that compose an application.

The composition controller 120 takes in the application definition 112 as input and produces an application state 122 which is a representation of the intended stack that will need to be realized by the system. The composition layer 120 will also persist and manage the application definition 112.

The state controller 130 takes in the application state 122 and produces an application graph 132. The application graph 132 is a graph of the services and resources that comprise the application. The state controller 130 persists and manages the application state 122. If the expected state does not match the actual state, the state controller 130 may take steps to reconcile the difference. For example, if an application state 122 requires a resource and the resource is down, then the state controller 130 may take steps to fix the resource or, if possible, replace the resource with a resource of the same type.

One purpose of the orchestration controller 140 is to ensure that the actual instances of the desired service will actually be built. In order to realize the intended application state, the orchestration controller 140 processes the application graph and orchestrates the creation and configuration of resources. The orchestration controller 140 also manages the active state of the application.

The orchestration controller 140 delegates resource creation to providers 160A, 160C, 160C, which are responsible for specific resources 170A, 170B, 170C. That is, this orchestration controller 140 translates the application graph 132 to a definition consumable by a provisioning tool (such as Smith), as well as calls to providers 160A, 160B, 160C.

The orchestration controller 140 consumes the application graph and produces the application resources 142. The orchestration controller processes the application graph 132 and orchestrates the creation and configuration of resources to realize the intended application state 122 as it is determined in the application graph 132.

The orchestration controller 140 manages the active state of the application. That is, the orchestration controller 140 detects changes in resources and updates the application state accordingly. For example, the orchestration controller 140 may detect that a resource is down and accordingly update the application state to reflect the unavailable resources.

Autowiring is also handled within the orchestration controller 140. As will be explained below, for each resource in the state object 122 (and therefore also in the application graph 132), the orchestration controller 140 invokes the corresponding autowiring function for that resource. The orchestration controller 140 works to transform each resource in the state object into bundle resources. As will be explained below in more detail, a provisioning object, or smith bundle, can be created from the bundle resources.

At a high level a provider is an application or other piece of software that provisions a requested resource. In the example of FIG. 1, a provider such as 160A, 160C, 160C is something that provides a particular resource type 170A, 170B, 170C. A user can specify a provider by specifying definitions of resources in a service descriptor. The logic of the provider is encapsulated within the provider 160A, 160B, 160C itself. In Kubernetes, a provider may be represented as a controller (that is, an active process) that is provisioning resources based on Kubernetes objects of a specific kind. Controllers in Kubernetes are either built-in controllers (that is, part of Kubernetes, shipped as a single program or docker image) or additional controllers built by third parties. Additional controllers are usually deployed in the Kubernetes cluster using the usual deployment mechanisms. Providers may work slightly differently for different container orchestration systems, but generally they will operate the same way.

A resource such as 170A, 170B 170C is an instance of a service, typically a software-as-a-service (SaaS) or other offering provided by a provider 160A, 160B, 160C. A resource definition, specified by the user contains data that can be used by the provider 160A, 160B, 160C to provide an instance of a system corresponding to the resource definition. In the example depicted in FIG. 1, resource 170A is a database such as dynamodb table, resource 170B is a service such as a simple queue service (SQS) queue, and resource 170C is a compute resource such as an Elastic Compute Cloud (EC2) compute group. Other examples include Amazon Web Services Relational Database Service (AWS RDS) or an API gateway configuration.

A resource such as 170A, 170B 170C can be defined in a state object. Resources can depend on each other when defined in the state object. In this disclosure, a resource from which another resource depends is referred to as a primary resource. A resource that depends on the primary resource is referred to as a dependent resource. These terms are designations to clarify which resource is referred to and only relate to a specific dependency. That is, a resource may be a primary resource for one dependency, and a dependent resource for another dependency. For example, a resource may depend on one primary resource in which case it is referred to as a dependent resource, but in relation to dependent resources that depend on the resource it is referred to as a primary resource.

Further, in this disclosure, compute can be modelled as a separate, distinct resource. This allows for more flexibility for services that may not need compute or may need multiple computes. It is also advantageous in that it provides clarity in the definition of the compute.

The various components depicted in FIG. 1 and outlined above are provide by one or more computer processing systems. An example computer processing system is described below with reference to FIG. 5.

Kubernetes System Overview

In the examples provided in this disclosure the components of an autowiring system run within a Kubernetes cluster and use Kubernetes objects to represent the desired state of the deployed service. Other implementations would work similarly but Kubernetes is used for illustrative purposes. As a result, some of the implementation details of the autowiring systems and methods of the present disclosure will be described with respect to a Kubernetes orchestration controller 140. Kubernetes provisions resources for the purpose of automating application deployment, scaling, and management. It will be appreciated that Kubernetes is merely used as an example to illustrate the autowiring methods described herein are not limited to operating with Kubernetes. It will be apparent therefore that autowiring can operate with other orchestration systems as well.

Figure 2:
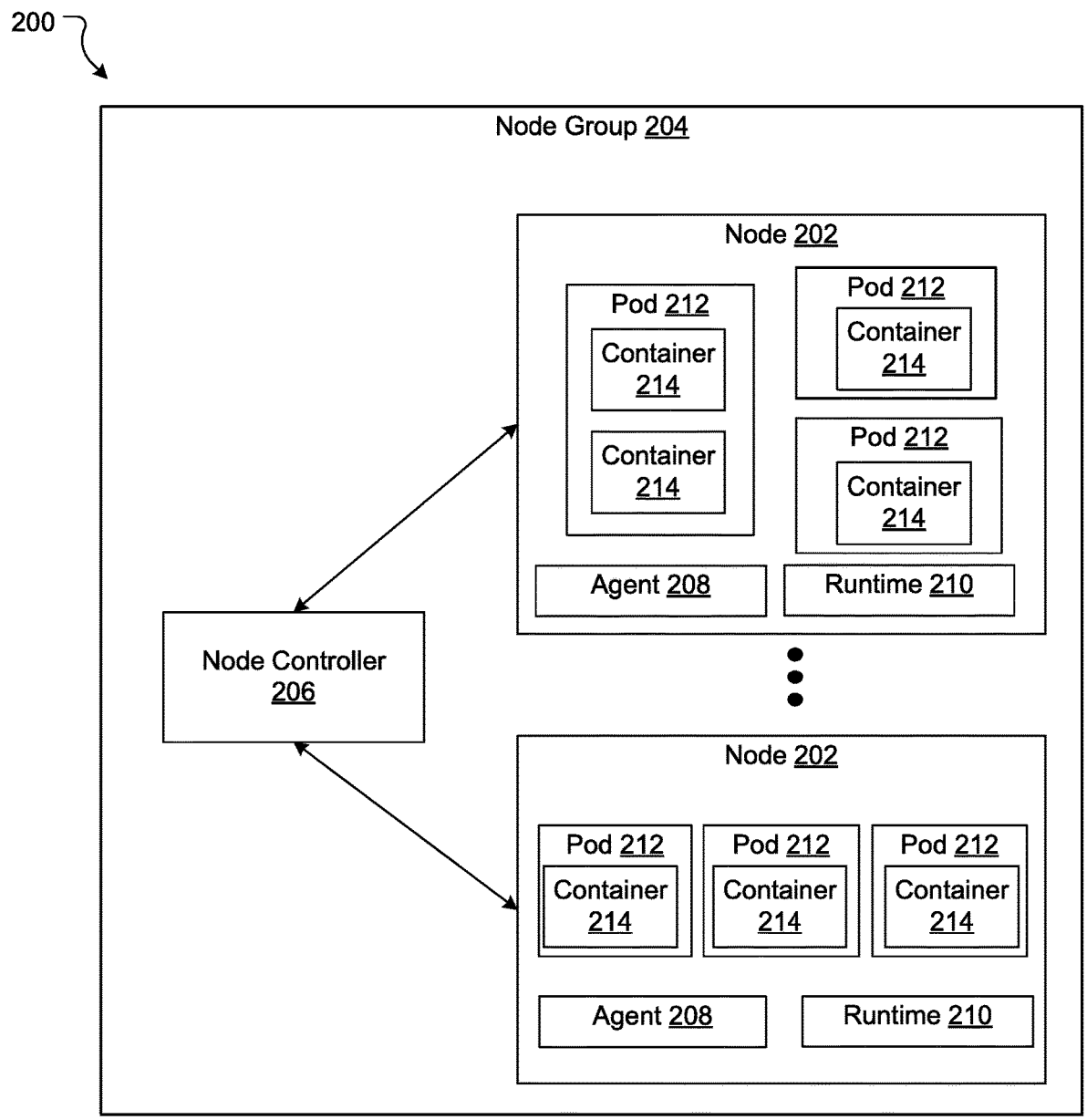
FIG. 2 is a block diagram of an example Kubernetes system.

A brief overview of Kubernetes and example system is provided here. FIG. 2 illustrates a typical Kubernetes architecture 200. In Kubernetes, an underlying compute resource (i.e., a physical computer processing system such as system 500 described below, or a virtual machine running on one or more physical systems) is called a node 202. A cluster of such worker machines that are all assigned to the same compute group is called a node group 204. Each node 202 in a particular node group 204 directly correlates with a corresponding compute resource assigned to the resource requesting system by the resource provider and in this disclosure the terms node and compute resource may be interchangeably used. Further, each node 202 in the node group 204 contains the services necessary to run containers and is managed by a common node controller 206.

The node controller 206 typically manages a list of the nodes 202 in the node group 204 and synchronizes this list with the resource provider's list of machines assigned to that particular resource requesting system. The node controller 206 may also be configured to communicate with the resource provider from time to time to determine if an underlying machine is still available or not. If an underlying machine is not available, the controller 206 is configured to delete the corresponding node 202 from its list of nodes. In this manner, the node controller 206 is always aware of the infrastructure assigned to the node group by the resource provider.

Each node includes an agent 208 that is configured to ensure that containers are running within the node and a runtime 210 that is responsible for running the containers. With the help of the agent 208 and runtime 210, one or more pods 212 may be launched on the active nodes 202 in a node group 204. A pod 212 is the basic building block of Kubernetes. A pod 212 encapsulates one or more containers 214, storage resources (not shown), and options that govern how the containers 214 should run.

Typically, the node controller 206 can query the agent 208 running on each node 202 in the node group 204 to retrieve information about the nodes including the available resources on the node: the CPU, memory, and the maximum number of pods 212 that can be scheduled onto the node 202 at any given time.

Exemplary Methods

This section describes methods and processes for automatically connecting multiple components of a microservice. Generally speaking, FIG. 3 describes an autowiring process according to some embodiments, whereas FIG. 4 describes a status autowiring process according to other embodiments. As noted previously, some non-limiting implementation details of the methods will be described with reference to Kubernetes as the orchestration system.

Figure 3:
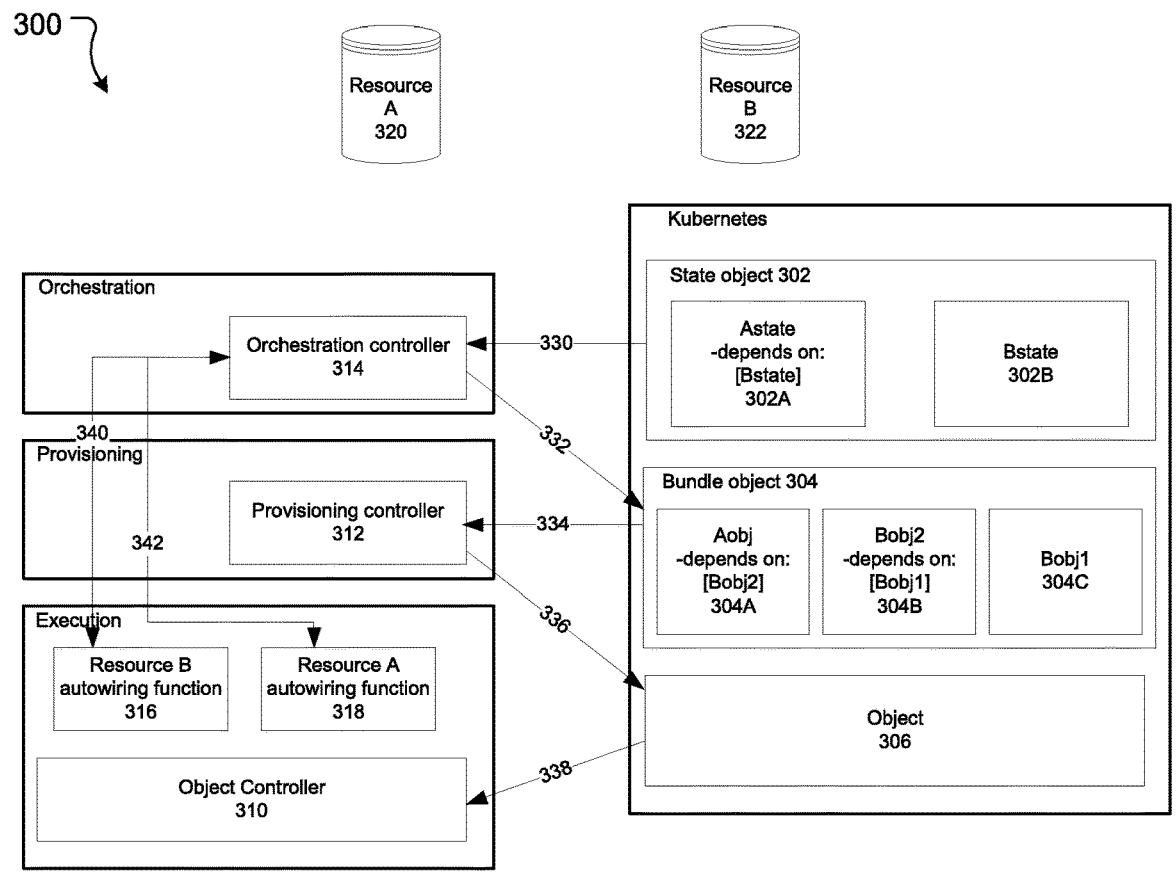
FIG. 3 is an illustration of an autowiring process.

In the example of FIG. 3, there are two resources: resource A 320 and resource B 322. The API 110, composition controller 120 and state controller 130 are not depicted in FIG. 3 and a state object 302 is the resulting output of the state controller 130.

The state object 302 is comprised of two state objects Astate 302A and Bstate 302B which correspond to the resources resource A 320 and resource B 322. The orchestration controller 314 picks up the state object 302 (comprising the two state objects 302A and 203B) and determines to invoke the autowiring functions of each of the resources: resource A 320 and resource B 322.

The next stage is a call to the autowiring function 316 for a resource A 320 which is in this example a dynamodb table. The resource A 320 may be any resource type and the orchestration controller 314 will work with it similarly. The call to the autowiring function 316 includes: Resource A 320, the defaults for objects of type dynamodb and shapes for each dependent resource.

Shapes are pieces of information about a resource exposed by the corresponding autowiring function. In this example resource A 320 depends on resource B 322, that is, resource B 322 is a primary resource and resource A 320 is a dependent resource, and so autowiring function 316B exposes shapes that may be used by autowiring function 318 for dependent resource A to decide how dependent resource A 320 can depend on resource B 322. This shape information should include anything the autowiring function for the depending resource should know about.

If Resource A depends on Resource B, then the autowiring function for Resource A will be looking for particular shapes (that is, one or more shapes with a specified name) in a list of shapes, exposed by autowiring function for B that resource A needs to realise that dependency. If resource A cannot find what it needs, then the orchestration controller 314 may report an error to the user. For example, if a state object defined a load balancer that depends on a database, then this could be considered by the orchestration controller 314 to be an invalid definition and hence the orchestration controller 314 may report an error. In this example, the autowiring function for the load balancer may not know how to depend on a database, and therefore does not know which shapes to look for in the list of shapes. Therefore the load balancer autowiring function will not be able to find the correct shape in the list because there would be no shapes in the shape list that the load balancer would know what to do with. In embodiments where the correct shapes are in the list of shapes, then if the correct shapes are found, the autowiring function for resource A uses the information to decide what to return.

In the example of FIG. 3, resource A 320 has dependencies on other resources within the same state object 302 (in this example resource B is a type of simple queue service (SQS)). The orchestration controller 314 may perform a topological sort on the graph of resources (which like application graph 132 in FIG. 1 in this example is provided at step 330) so that those resources that have no dependencies are processed first. The shapes returned by their autowiring functions (316, 318) is provided as input so the dependencies can represented as a list of tuples: [(resource A, shapesFrom(autowiringForBar(resource B))), . . . ]

As part of the call 340 to the resource B autowiring function 316, the orchestration controller 314 passes the Bstate state object 302B. The defaults are resource type specific so in this case the defaults would be SQS specific. Typically the defaults for the resource are included in the call to the resource B autowiring function 316. Although the defaults for the resource type of resource B 322 are included in the Bstate state object 302B, the defaults would not have been applied yet even if they had been added earlier.

Autowiring functions return not only shapes, but also bundle resources to put into a bundle object 304 (which is the input for the provisioning controller 312). However only the shapes are available for any other resources that are dependent on that resource. So in this case, the shapes of resource B will be available to resource A.

Typically returned shapes contain some information about the Bundle Resources returned by that function so that dependent resources can make some use of them. In this example, the resource B autowiring function 316 returns two bundle resources: Bobj1 304C and Bobj2 304B. Further, bundle resource 304C has a dependency on bundle resource 304B. The autowiring function 316 also returns shapes that contain information about resource B 322 and how to consume bundle resources such as Bobj1 304C and Bobj2 304B.

As part of the call 342 to the resource A autowiring function 318, the orchestration controller 314 passes Astate state object 302A, the defaults for that resource type, and the shapes for resource B to the resource A autowiring function 318.

Resource A Autowiring Function 318 constructs a response where it returns bundle resources that depend on each other. There are many forms of dependency. In this example application, resource A 320 may consume outputs of resource B 322. Alternatively, there could also be references to fields of Bobj2 304B. References to the fields of Bobj1 304C would also be possible although it would create an additional dependency on Bobj1 304C.

The resource A autowiring function 318 will use the shapes returned by the resource B autowiring function 316 and create references from the shapes. An example of a shape is BindableEnvironmentVariable, which is commonly returned from other resources such as a database resource that may be used with a compute resource in order for the compute resource to be able to depend on that database resource.

The orchestration controller 314 collects the bundle resources 304A, 304B and 304C and puts them into a bundle object 304 which is illustrated in FIG. 3 at step 332. The orchestration controller 314 may do this via creating a kubernetes object via the kubernetes API.

Provisioning controller 312 takes as input at step 334 the group of resources which is bundle object 304. That is, the group of resource is defined using a bundle (just like a Stack for AWS CloudFormation). The provisioning controller 312 watches for new instances of a bundle (and events to existing ones), which in this example is the bundle object 304. Also, in this example, the bundle object 304 is a Kubernetes custom resource.

In this example, the provisioning controller 312 picks up the bundle object 304 and processes it. Processing involves parsing the bundle, building a dependency graph (which is implicitly defined in the bundle object 304), walking the graph, and creating/updating necessary resources, which in this example are resource A 320 and resource B 322. The provisioning controller 312 produces 336 the object 306, which is an input to the object controller 310 at step 338. In use, the object controller 310 maintains the execution of the objects.

In some embodiments, data required to build an object 306 is not available yet at the time when the provisioning controller 312 constructs the object 306. This is especially the case when some data, required to use dependent resource, is only available after it has been actually provisioned. In such cases the autowiring function such as autowiring functions 316, 318 may use references. The references can be used to determine the actual value in the object that will be created in the future. An example is a secret (a secret is an object in Kubernetes that contains a small amount of sensitive data such as a password, a token, or a key) produced by a ServiceBinding resource that will be created by a Service Catalog service after issuing service binding request to the Broker service. In this case, the output of the autowiring function for the ServiceBinding resource contains only a template of a Kubernetes object rather than a fully completed Kubernetes object. The provisioning controller 312, before creating or updating the Kubernetes object 306 will replace all variables inside the template with actual values.

Status Autowiring

In some embodiments, the provisioning controller 316 will attempt to make the running instance of a service architecture the same as a service descriptor. That is, the provisioning controller 316 will keep trying until it succeeds or terminally fails. For example, if user A had a service descriptor with (compute, database, queue) and user B had a service descriptor with (compute, database). In a system where the service is defined in relation to deployments, user A could deploy first and the queue will be maintained even if user B deploys. In this disclosure, if user B deploys, then the queue will be deleted as the queue is not in the service descriptor. This may mean that user A's deployment malfunctions. If user A deploys again, then the system will try to establish a queue because the system will attempt to ensure that the running instance matches the service descriptor. The system will keep trying to do this until it succeeds or fails in some terminal way.

Further, a failing compute resource which may for example have been overloaded and not responding for 30 seconds may need to be restored. The provisioning controller 316 will keep trying to restore the compute resource until it succeeds or terminally fails. As may be evident from these examples, the status of the resources that are provisioned and executed needs to be able to be determined in order to ensure the correct resource is running.

Figure 4:
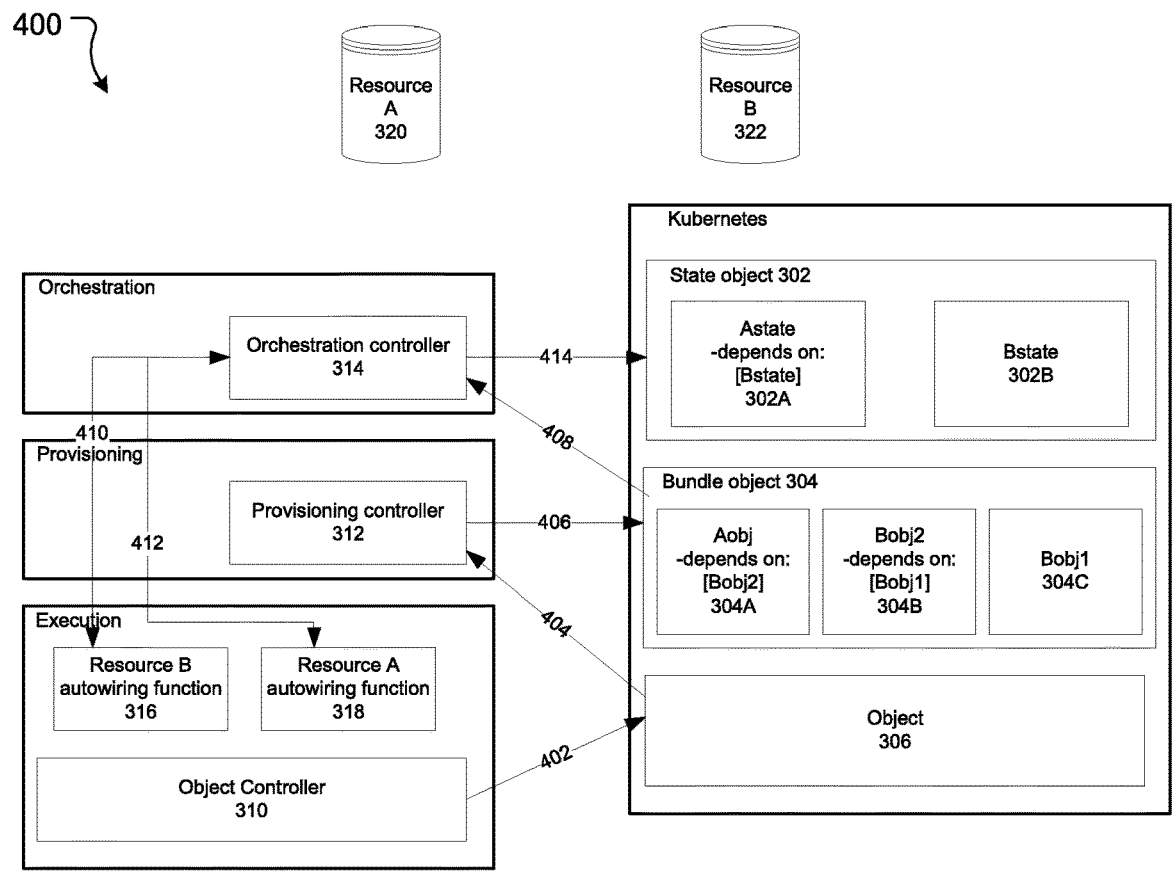
FIG. 4 is an illustration of a status autowiring process.

FIG. 4 illustrates an example 400 for status autowiring, which is the process of determining a status for a resource from the bundle resources it was transformed into (see the example 300 above). The status autowiring is performed by each autowiring function 316, 318 corresponding to a resource 320, 322.

In this example, the object controllers 310 update 402 the status of the objects 306 they are responsible for. The provisioning controller 312 ("smith") watches the objects 306 and detects 404 any updates to the objects 306. In some embodiments, the provisioning controller 312 may have built-in support for some kinds of objects and therefore can detect whether an object 306 is updated or is in an error state.

The provisioning controller 312 then updates 406 information about each of the bundle resources 304A 304B 304C in the bundle object 304.

The orchestration controller 314 remains watching the bundle object 304 and detects 408 any updates to the bundle object 304.

The orchestration controller 314 calls autowiring functions for each resource (that is resource A 320 and resource B 322) to get aggregate status information for it. The orchestration controller 314 will call 410, 412 the autowiring function 316, 318 with the list of bundle resources the resource was bundled into. In this example, resource b is bundled into bundle resource Bobj2 304B and Bobj1 304C. For each of these bundle resource the status information from the bundle is included. As part of the calls 410, 412 to the corresponding autowiring function 316, 318 the orchestration controller 314 may include the status of any plugins or other tools.

Finally, the orchestration controller 314 updates 414 the status of the state object with the results from the autowiring functions on each of the resources.

Resource Examples

The following is an example of a location description (in the yaml language):

```
apiVersion: formation.voyager.atl-paas.net/v1
kind: LocationDescriptor
metadata:
  name: my-service-name
spec:
  configMapName: service-metadata
  configMapNames:
    release: service-release
  resources:
  - name: event-stream
    type: Kinesis
    spec:
      ShardCount: 2
  - name: notifications
    type: SNS
```

```
    - name notification-queue
      type: SQS
      dependsOn:
        - { name: notifications, attributes: {RawMessageDelivery: true }}
    - name: gen
      type: EC2Compute
      dependsOn:
        - event-stream
        - notification-queue
      spec:
        sd:
          description: Event Generator
          links:
            binary:
              type: docker
              name: example.com
              tag: "1.0"
            healthcheck:
              uri: admin/ping
          name: Event Generator
          scaling:
            min: 1
            max: 1
          instance: t2.micro
          requiresAsap: true
        rename:
          KINESIS_EVENTSTREAM_STREAMNAME:
STREAM_NAME
          KINESIS_EVENTSTREAM_STREAMREGION:
STREAM_REGION
```

The following is the simplest dynamodb resource that can be provisioned:

```
- name: myddb
  type: DynamoDB
  spec:
    ReadCapacityUnits: 1
    WriteCapacityUnits: 1
    HashKeyName: leaseKey
    HashKeyType: "S"
```

The following is a more complex example of dynamodb.

```
- name: index-example
  type: DynamoDB
  spec:
    ReadCapacityUnits: 1
    WriteCapacityUnits: 1
    HashKeyName: LogicalKey
    HashKeyType: "S"
    RangeKeyName: Version
    RangeKeyType: "N"
    LocalSecondaryIndexes:
      - IndexName: MyLocalIndex
        RangeKeyName: RoomName
        RangeKeyType: "S"
        ProjectionType: ALL
    GlobalSecondaryIndexes:
      - IndexName: MyGlobalIndexWithOverriddenReadAndWrite
        HashKeyName: ABC
        HashKeyType: "S"
        RangeKeyName: DEFG
        RangeKeyType: "S"
        ReadCapacityUnits: 2
        WriteCapacityUnits: 2
        ProjectionType: KEYS_ONLY
      - IndexName: MyGlobalIndex
        HashKeyName: Topic
        HashKeyType: "S"
        RangeKeyName: Category
        RangeKeyType: "S"
        ProjectionType: INCLUDE
        NonKeyAttributes:
          - Users
```

SQS (Amazon Simple Queue Service) is a resource type that provides a messaging queue service that can handle messages or workflows between components. The following is a simple SQS resource.

```
name: my-queue
type: SQS
spec:
  VisibilityTimeout: 300
  MaxReceiveCount: 10
```

The following is an example bundle.

```
apiVersion: smith.atlassian.com/v1
kind: Bundle
metadata:
  creationTimestamp: null
  name: ptl-percolator
  namespace: ptl-percolator
  ownerReferences:
  - apiVersion: orchestration.voyager.atl-paas.net/v1
    blockOwnerDeletion: true
    controller: true
    kind: State
    name ptl-percolator
    uid: ""
spec:
  resources:
  - name ups--instance
    spec:
      object:
        apiVersion: servicecatalog.k8s.io/v1beta1
        kind: ServiceInstance
        metadata:
          name: ups
        spec:
          clusterServiceClassExternalID: 4f6e6cf6-ffdd-425f-a2c7-3c9258ad2468
          clusterServicePlanExternalID: 86064792-7ea2-467b-af93-ac9694d96d52
  - name compute--ups--binding
    references:
      - example: aname
        name: ups--instance
        path: metadata.name
        resource: ups--instance
```

```
    spec:
      object:
        apiVersion: servicecatalog.k8s.io/v1beta1
        kind: ServiceBinding
        metadata:
          name: compute--ups
        spec:
          instanceRef:
            name: '!{ups--instance}'
          secretName: compute--ups
  - name compute--secret
    references:
      - modifier: bindsecret
        name: compute--ups--binding-9ef60b9337b69a1033a0912d66168890c6c4831a
        path: data.special-key-2
        resource: compute--ups--binding
      - modifier: bindsecret
        name: compute--ups--binding-b060c986d8a40dd8b22ad738b0fe6df917f5c994
        path: data.special-key-1
        resource: compute--ups--binding
    spec:
      plugin:
        name: secret
        objectName: compute--secret
        spec:
          jsondata:
            ec2ComputeEnvVars:
              secretEnvVars:
                UPS_UPS_SPECIAL_KEY_1: '!{compute--ups--binding-b060c986d8a40dd8b22ad738b0fe6df917f5c994}'
                UPS_UPS_SPECIAL_KEY_2: '!{compute--ups--binding-9ef60b9337b69a1033a0912d66168890c6c4831a}'
  - name compute---iamrole
    spec:
      plugin:
        name: iamrole
        objectName: compute---iamrole
        spec:
          assumeRoles:
          - arn:aws:iam::123456789012:role/micros-server-iam-MicrosServer-ABC
          computeType: ec2Compute
          createInstanceProfile: true
          managedPolicies:
          - arn:aws:iam::123456789012:policy/SOX-DENY-IAM-CREATE-DELETE
          - arn:aws:iam::123456789012:policy/micros-iam-DefaultServicePolicy-ABC
          oapResourceName: compute-iamrole
          policySnippets: { }
          serviceEnvironment:
            alarmEndpoints:
              - consumer: exampleConsumer
                endpoint: example.com
                priority: high
                type: CloudWatch
              - consumer: exampleConsumer
                endpoint: example.com
                priority: low
                type: CloudWatch
            notificationEmail: an_owner@example.com
            primaryVpcEnvironment:
              appSubnets:
              - subnet-1
              - subnet-2
              instanceSecurityGroup: sg-2
              jumpboxSecurityGroup: sg-1
              privateDnsZone: testregion.atl-inf.io
              privatePaasDnsZone: testregion.dev.paas-inf.net
              region: testregion
              sslCertificateId: arn:aws:acm:testregion:123456789012:certificate/253b42fa-047c-44c2-8bac-777777777777
              vpcId: vpc-1
              zones:
              - testregiona
              - testregionb
            tags:
              business_unit: some_unit
              environment: microstestenv
              environment_type: testenv
              platform: voyager
              resource_owner: an_owner
```

```
                service_name: test-servicename
              serviceId: test-servicename-compute
      - name: compute---iamrole-binding
        references:
          - name: compute---iamrole-metadata-name
            path: metadata.name
            resource: compute---iamrole
        spec:
          object:
            apiVersion: servicecatalog.k8s.io/v1beta1
            kind: ServiceBinding
            metadata:
              name: compute---iamrole
            spec:
              instanceRef:
                name: '!{compute---iamrole-metadata-name}'
              secretName: compute---iamrole
      - name: compute--instance
        references:
          - name: compute--secret-metadata-name
            path: metadata.name
            resource: compute--secret
          - example: arn:aws:iam::123456789012:role/path/role
            modifier: bindsecret
            name: compute---iamrole-binding-IAMRoleARN
            path: data.IAMRoleARN
            resource: compute---iamrole-binding
          - example: arn:aws:iam::123456789012:instance-profile/path/Webserver
            modifier: bindsecret
            name compute---iamrole-binding-InstanceProfileARN
            path: data.InstanceProfileARN
            resource: compute---iamrole-binding
        spec:
          object:
            apiVersion: servicecatalog.k8s.io/v1beta1
            kind: ServiceInstance
            metadata:
              name: compute
            spec:
              clusterServiceClassExternalName: micros
              clusterServicePlanExternalName: v2
              parameters:
                alarmEndpoints:
                  - consumer: exampleConsumer
                    endpoint: example.com
                    priority: high
                    type: CloudWatch
                  - consumer: exampleConsumer
                    endpoint: example.com
                    priority: low
                    type: CloudWatch
                autoScalingGroup:
                  maxSize: 2
                  minSize: 1
                docker:
                  compose:
                    backendapp:
                      image: docker.example.com/my-app
                      ports:
                      - 8080:8080
                      tag: "1.0"
                  envVars:
                    ASAP_PUBLIC_KEY_FALLBACK_REPOSITORY_URL: ht-tps://asap-distribution.us-east-1.staging.paas-inf.net/
                    ASAP_PUBLIC_KEY_REPOSITORY_URL: ht-tps://asap-distribution.us-west-1.staging.paas-inf.net/
                    key: value
                ec2:
                  iamInstanceProfileArn: '!{compute---iamrole-binding-InstanceProfileARN}'
                  iamRoleArn: '!{compute---iamrole-binding-IAMRoleARN}'
                  instanceType: t2. small
                location:
                  account: testaccount
                  envType: testenv
                  region: testregion
                meaninglesskey: used as an example
                notifications:
                  email: notification@email.com
                service:
```

```
        id: test-servicename-compute
        loggingId: logging-id-from-configmap
        ssamAccessLevel: access-level-from-configmap
      tags:
        business_unit: some_unit
        platform: voyager
        resource_owner: an_owner
      parametersFrom:
      - secretKeyRef:
        key: ec2ComputeEnvVars
        name: '!{compute--secret-metadata-name}'
status: { }
```

Computer Processing System

Various embodiments and features of the present disclosure are implemented using one or more computer processing systems.

Figure 5:
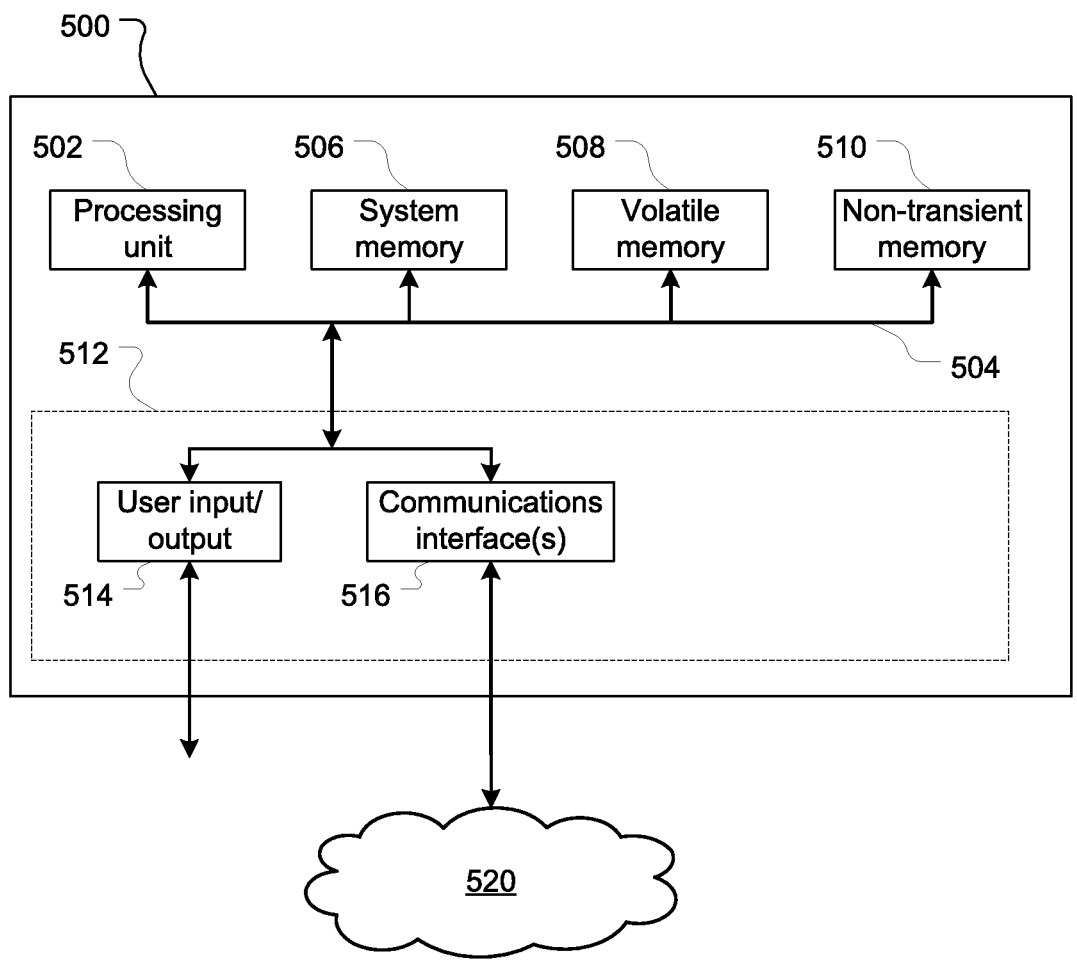
FIG. 5 is a block diagram of a computer processing system configurable to perform various features of the present disclosure.

FIG. 5 provides a block diagram of a computer processing system 500 configurable to implement embodiments and/or features described herein. System 500 is a general purpose computer processing system. It will be appreciated that FIG. 5 does not illustrate all functional or physical components of a computer processing system. For example, no power supply or power supply interface has been depicted, however system 500 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 500 includes at least one processing unit 502. The processing unit 502 may be a single computer processing device (e.g. a central processing unit, graphics processing unit, or other computational device), or may include a plurality of computer processing devices. In some instances all processing will be performed by processing unit 502, however in other instances processing may also be performed by remote processing devices accessible and useable (either in a shared or dedicated manner) by the system 500.

Through a communications bus 504 the processing unit 502 is in data communication with a one or more machine readable storage (memory) devices which store instructions and/or data for controlling operation of the processing system 500. In this example system 500 includes a system memory 506 (e.g. a BIOS), volatile memory 508 (e.g. random access memory such as one or more DRAM modules), and non-volatile memory 510 (e.g. one or more hard disk or solid state drives).

System 500 also includes one or more interfaces, indicated generally by 512, via which system 500 interfaces with various devices and/or networks. Generally speaking, other devices may be integral with system 500, or may be separate. Where a device is separate from system 500, connection between the device and system 500 may be via wired or wireless hardware and communication protocols, and may be a direct or an indirect (e.g. networked) connection.

Wired connection with other devices/networks may be by any appropriate standard or proprietary hardware and connectivity protocols. For example, system 500 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 500 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 500 connects—whether by wired or wireless means—include one or more input devices to allow data to be input into/received by system 500 for processing by the processing unit 502, and one or more output device to allow data to be output by system 500. Example devices are described below, however it will be appreciated that not all computer processing systems will include all mentioned devices, and that additional and alternative devices to those mentioned may well be used.

For example, system 500 may include or connect to one or more input devices by which information/data is input into (received by) system 500. Such input devices may include keyboards, mice, trackpads, microphones, accelerometers, proximity sensors, GPS devices and the like. System 500 may also include or connect to one or more output devices controlled by system 500 to output information. Such output devices may include devices such as a CRT displays, LCD displays, LED displays, plasma displays, touch screen displays, speakers, vibration modules, LEDs/other lights, and such like. System 500 may also include or connect to devices which may act as both input and output devices, for example memory devices (hard drives, solid state drives, disk drives, compact flash cards, SD cards and the like) which system 500 can read data from and/or write data to, and touch screen displays which can both display (output) data and receive touch signals (input).

System 500 may also connect to one or more communications networks (e.g. the Internet, a local area network, a wide area network, a personal hotspot etc.) to communicate data to and receive data from networked devices, which may themselves be other computer processing systems.

System 500 may be any suitable computer processing system such as, by way of non-limiting example, a server computer system, a desktop computer, a laptop computer, a netbook computer, a tablet computing device, a mobile/smart phone, a personal digital assistant, a personal media player, a set-top box, a games console. [note repetition in computer processing system description]

Typically, system 500 will include at least user input and output devices 514 and a communications interface 516 for communication with a network.

System 500 stores or has access to computer applications (also referred to as software or programs)—i.e. computer readable instructions and data which, when executed by the processing unit 502, configure system 500 to receive, process, and output data. Instructions and data can be stored on non-transient machine readable medium accessible to system 500. For example, instructions and data may be stored on non-transient memory 510. Instructions and data may be transmitted to/received by system 500 via a data signal in a transmission channel enabled (for example) by a wired or wireless network connection.

Applications accessible to system 500 will typically include an operating system application such as Microsoft Windows®, Apple OSX, Apple IOS, Android, Unix, or Linux.

System 500 also stores or has access to applications which, when executed by the processing unit 502, configure system 500 to perform various computer-implemented processing operations described herein. For example, and referring to the environment of FIG. 1 and FIG. 2 above, client system 200 includes an orchestration controller 140 orchestrates the providers 160A,160B, 160C to provide the described resources 170A, 170B, 170C.

In some cases part or all of a given computer-implemented method will be performed by system 500 itself, while in other cases processing may be performed by other devices in data communication with system 500.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. Although these flowcharts define steps in particular orders to explain various features, in some cases the steps may be able to be performed in a different order. Furthermore, in some cases one or more steps may be combined into a single step, a single step may be divided into multiple separate steps, and/or the function(s) achieved by one or more of the described/illustrated steps may be achieved by one or more alternative steps. Still further, the functionality/processing of a given flowchart step could potentially be performed by various different systems or applications.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A computer-implemented method for automatically connecting multiple components of a microservice architecture, comprising:
   receiving a user input selecting a software service application to be instantiated;
   generating a definition file based on the user input, the definition file defining an application graph comprising set of resources, each of which is used to instantiate the software service application;
   defining a set of resource bundles from the application graph by, for each respective resource of the set of resources:
      defining the respective resource as a primary resource type;
      identifying, based on the definition file, a dependent resource type upon which the primary resource type depends;
      defining a resource bundle, the resource bundle comprising instructions for: instantiating a first resource of the dependent resource type;
   instantiating a second resource of the primary resource type;
      communicably coupling the first resource to the second resource by: for each respective input of the dependent resource type, associate one respective output of the primary resource type; and
         for each respective input of the primary resource type, associate one respective output of the dependent resource type;
      monitoring a respective operation state of the respective resource bundle and, upon determining that the respective operation state has changed, updating an operational status of the respective resource bundle;
   defining from the set of resource bundles, a dependency graph;
   provisioning, with a provisioning controller, each resource of each resource bundle of the dependency graph; and
   updating a status of the software service application based at least in part on an operational status of at least one resource bundle of the set of resource bundles, the status indicating that the software service application has been instantiated.

2. The computer-implemented method of claim 1, wherein:
   the definition file is a first definition file; and
   the application graph is further defined by a second definition file.

3. The computer-implemented method of claim 2, wherein identifying a dependent resource type upon which a respective primary resource type depends comprises performing a topological sort of the application graph.

4. The computer-implemented method of claim 3, wherein provisioning each resource of each resource bundle of the dependency graph is performed in an order determined at least in part by the topological sort.

5. Non-transitory computer-readable storage media storing sequences of instructions which, when executed by a processor, cause the processor to:
   receive a user input comprising a selection of an application graph;

generate a dependency graph from the application graph, the dependency graph comprising a resource bundle, the resource bundle comprising a primary resource and a dependent resource;

identify a first definition of primary resource based on a first type of the primary resource;

identify a second definition of the dependent resource based on a second type of the dependent resource;

identify a communication interface of the primary resource;

communicably couple the communication interface of the primary interface with the dependent resource; and define a provisioning object based on the primary resource, the dependent resource, and the communication interface of the primary resource, wherein, a provisioning controller is configured to:

use the provisioning object to provision the resource bundle; and monitor an operational state of the provisioned resource bundle and, upon determining that the operational state has changed, updating an operational status of the resource bundle.

6. The non-transitory computer-readable storage media of claim 5, the dependency graph comprising two or more resource bundles, each defining at least one respective primary resource and at least one respective dependent resource.

7. The non-transitory computer-readable storage media of claim 6, wherein generating the dependency graph from the application graph comprises performing a topological sort of the application graph.

8. The non-transitory computer-readable storage media of claim 7, wherein the provisioning object defines an resource instantiation order defined by the topological sort.

9. A system for automatically connecting multiple components of a microservice architecture, the system comprising:

one or more processors; and one or more non-transitory computer-readable storage media storing sequences of instructions which, when executed by the one or more processors, cause the one or more processors to:

receive an input identifying a software service application defined by an application graph;

generating, from the application graph, at least one resource bundle, the at least one resource bundle comprising a definition of a primary resource;

determine a dependent resource of the primary resource based on the definition of the primary resource;

request the primary resource to determine one or more shapes of the primary resource, wherein a shape is information about the primary resource that is necessary for the dependent resource to depend on the primary resource;

receive the one or more shapes of the primary resource;

provide the one or more shapes of the primary resource to the dependent resource;

generate a provisioning object based on the one or more shapes of the primary resource; and provision the software service application by providing the provisioning object to a provisioning controller, the provisioning controller configured to monitor an operational state of the at least one resource bundle and, upon determining that the operational state has changed, updating an operational status of the software service application.

10. The system of claim 9, wherein the resource bundle comprises two or more definitions of primary resources.

11. The system of claim 10, wherein determining a dependent resource comprises performing a topological sort of the application graph.

12. The system of claim 11, wherein generating a provisioning object comprises determining a provisioning object for each of the resources in order determined by the topological sort.

13. The system of claim 9, wherein, prior to provisioning the software service application, determining a status of the primary resource and the dependent resource.

* * * * *